United States Patent [19]

Gell, Jr.

[11] Patent Number: 4,980,707
[45] Date of Patent: Dec. 25, 1990

[54] PRESSURE COMPENSATION METHOD AND APPARATUS FOR UNDERWATER EQUIPMENT

[75] Inventor: Harold A. Gell, Jr., Silver Spring, Md.

[73] Assignee: Sea Fathoms Industries, Inc., Silver Spring, Md.

[21] Appl. No.: 491,094

[22] Filed: Mar. 9, 1990

[51] Int. Cl.⁵ .............................................. G03B 17/08
[52] U.S. Cl. ...................................... 354/64; 114/312
[58] Field of Search .......................... 354/64; 114/312

[56] References Cited

U.S. PATENT DOCUMENTS

| | | | |
|---|---|---|---|
| 1,131,712 | 3/1915 | Klein | 114/312 |
| 3,162,107 | 12/1964 | Byers | 95/11 |
| 3,717,078 | 2/1973 | Ogura | 95/11 |
| 3,759,605 | 9/1973 | Johnson | 350/179 |
| 4,041,507 | 8/1977 | Ko et al. | 354/64 |
| 4,113,137 | 9/1978 | Wind | 220/319 |
| 4,281,343 | 7/1981 | Monteiro | 358/99 |
| 4,763,145 | 8/1988 | Talsamura et al. | 354/64 |
| 4,771,299 | 9/1988 | Gell, Jr. | 354/64 |
| 4,771,320 | 9/1988 | Gell | 354/64 |
| 4,853,722 | 8/1989 | Gell, Jr. | 354/64 |

FOREIGN PATENT DOCUMENTS

| | | | |
|---|---|---|---|
| 2926224 | 1/1980 | Fed. Rep. of Germany | 354/64 |
| 1043770 | 6/1952 | France | 354/64 |

Primary Examiner—Michael L. Gellner
Attorney, Agent, or Firm—Harold Gell

[57] ABSTRACT

A method and apparatus for pressure compensating an under water housing which includes a tubular structure sealed around a hole in the housing dimensioned so that the mouth of an inflated balloon will form a secure seal there on so that the housing may be pressure compensated by blowing up the balloon and sealing the balloon mouth around the tube.

12 Claims, 1 Drawing Sheet

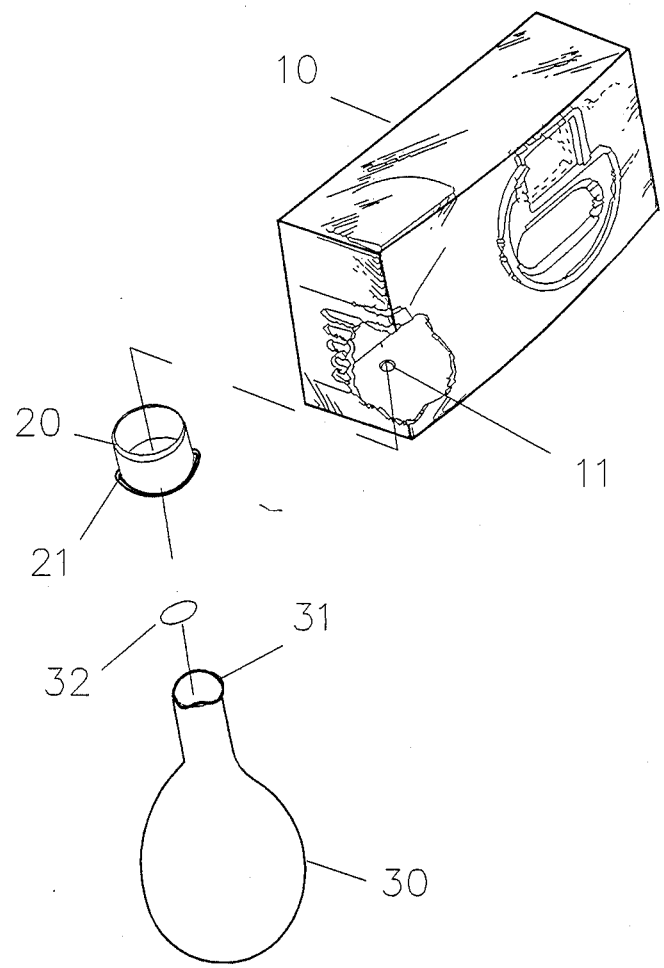

PRESSURE COMPENSATION METHOD AND APPARATUS FOR UNDERWATER EQUIPMENT

FIELD OF THE INVENTION

The present invention relates to the use of an inflated balloon to pressure compensate an underwater device.

RELATED APPLICATIONS

This is related to U.S. patent application Ser. No. 07/113,913 filed Oct. 29, 1987 for "Method And Apparatus For Underwater Operation Of Non-Waterproof Equipment" and issued Sept. 13, 1988 as U.S. Pat. No. 4,771,299; U.S. patent application Ser. No. 07/085,336 filed Aug. 14, 1987 for "Method And Apparatus For Extending The Depth Range Of Underwater Equipment" and issued Sept. 13, 1988 as U.S. Pat. No. 4,771,320; and U.S. patent application Ser. No. 07/243,596 filed Sept. 12, 1988 for "Method And Apparatus For Extending The Depth Range Of Underwater Equipment" and issued Aug. 1, 1989 as U.S. Pat. No. 4,853,722. The contents of all three patents are hereby incorporated in this application by reference.

BACKGROUND OF THE INVENTION

Recent advancements in underwater systems have led to the development of inexpensive devices such as the single use camera described in U.S. Pat. No. 4,882,600 issued to A. Van de Moere. These devices use waterproof casings that are relatively thin with respect to prior underwater housing and which include ridged and semirigid portions. The semirigid portion are designed to flex and allow an operator to activate a push button control. This concept works well at very shallow depths but it is not practical at normal sport diving depths.

OBJECTIVES OF THE INVENTION

A primary objective of the present invention is to provide an inexpensive means to equalize the pressure within an underwater means to ambient pressure.

Another objective of the present invention is to provide a means whereby an inflated balloon may be pneumatically attached to an underwater housing to provide a source of pressure compensating gas.

Another objective of the present invention is to provide a method for pressure compensating an underwater device to extend its operational depth limits.

SUMMARY OF THE INVENTION

The present invention includes a tubular structure which is sealed around a hole in an underwater housing. A balloon is blown up sufficiently to provide the volume of air required to pressure compensate the housing at the desired depth and the balloon mouth is sealed around the tube.

DESCRIPTION OF THE DRAWINGS

The single figure illustrates is an exploded view of the components comprising the invention.

DESCRIPTION OF THE INVENTION

In the figure representing the preferred embodiment of the invention, the waterproof casing 10 of an underwater camera includes a small hole 11. A walled structure such as an open ended tube 20 is sealed around the hole. The tube 20 is provided with a ridge or bead 21 around the outer periphery of the tube to provide a means to hold the mouth 31 of the balloon 30 in place. If desired, a rubber band 32 or other clamping means may be used to increase the security of the balloon/tube seal. The relative sizes of the balloon and camera case are selected so that the capacity of the balloon will be sufficient for contemplated operations. The relative sizes of the tube, bead and balloon mouth are selected to allow the balloon mouth to stretch over the bead and form a gas tight seal about the tube.

The method of using the invention includes the steps of blowing up the balloon to a volume sufficient to provide the gas or air needed for pressure compensation at the anticipated operational depth. The volume of gas is calculated according to Boyle's Law to be equal to the gas volume within said underwater housing at a first ambient pressure for operations at an increased pressure of one atmosphere. In other words, if the operational depth is to be around 33 feet or 10 meters, the balloon is blown up with a gas volume equal to the gas volume of the housing. If the depth is two atmospheres greater than sea level or 66 feet (20 meters), the volume of the gas should be equal to two times the volume of the housing and for 99 feet or 30 meters, three times the housing volume.

When the balloon is properly inflated, its mouth is stretched over the bead around the top of the tube and allowed to seal with out losing gas during the operation. A clamp may be placed around the balloon neck and tube to improve the seal and balloon retention.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A pressure compensation system for an underwater device comprising:
    a water proof housing:
    a hole in said water proof housing;
    a continuous wall means on the exterior of said water proof housing encircling said hole for fastening the mouth of a balloon to said water proof housing whereby the interior of said balloon is pneumatically coupled to the interior of said water proof housing via said hole.

2. An apparatus as defined in claim 1, comprising:
    means for preventing said balloon from sliding off said continuous wall, including a ridge around the outer periphery of said continuous wall dimensioned to allow the mouth of said balloon to be stretched over said ridge onto the body of said continuous wall.

3. A pressure compensation system for an underwater device as defined in claim 1 wherein said continuous wall is a tubular structure.

4. An apparatus as defined in claim 1 wherein said underwater device is a camera.

5. A pressure compensation system for an underwater device comprising:
    a balloon;
    a water proof housing:
    a hole in said water proof housing;
    a continuous wall means on the exterior of said water proof housing encircling said hole for fastening the mouth of a balloon to said water proof housing whereby the interior of said balloon is pneumatically coupled to the interior of said water proof housing via said hole.

6. An apparatus as defined in claim 5 wherein said underwater device is a camera.

7. An apparatus as defined in claim 5, comprising:
means for preventing said balloon from sliding off said continuous wall, including a ridge around the outer periphery of said continuous wall dimensioned to allow the mouth of said balloon to be stretched over said ridge onto said continuous wall.

8. An apparatus as defined in claim 5 wherein said continuous wall is a tube open at both ends and sealed at one end to the exterior of said water proof housing.

9. A pressure compensation system for an underwater camera comprising:
a water proof housing:
a pneumatic port in said water proof housing;
tubular means emanating from said water proofed housing and encircling said pneumatic port for fastening the mouth of a balloon to said water proof housing whereby the interior of said balloon is pneumatically coupled to the interior of said water proof housing via said hole.

10. An apparatus as defined in claim 9, comprising:
means for preventing said balloon from sliding off said tube, including a ridge around the outer periphery of said tube dimensioned to allow the mouth of said balloon to be stretched over said ridge onto the body of said tube.

11. A method for pressure compensating an underwater device, including the steps of:
blowing up a balloon with a volume of gas sufficient to equalize the pressure within said underwater device at an estimated operational depth; and sealing the mouth of said balloon over an opening into said underwater device.

12. A method for pressure compensating an underwater device as defined in claim 11 wherein said volume of gas is calculated according to Boyle's Law to be equal to the gas volume within said underwater housing at a first ambient pressure for operations at an increased pressure of one atmosphere.

13. A method for pressure compensating an underwater device as defined in claim 11 wherein said gas is air.

* * * * *